US012435517B2

(12) United States Patent
Horta et al.

(10) Patent No.: US 12,435,517 B2
(45) Date of Patent: Oct. 7, 2025

(54) TOGGLE BOLT CONNECTOR SYSTEM FOR HOLLOW JOIST

(71) Applicant: Fortress Iron, LP, Garland, TX (US)

(72) Inventors: Johnathan Horta, Dallas, TX (US); Michael J. Sawka, Garland, TX (US)

(73) Assignee: Fortress Iron, LP, Garland, TX (US)

( * ) Notice: Subject to any disclaimer, the term of this patent is extended or adjusted under 35 U.S.C. 154(b) by 312 days.

(21) Appl. No.: 17/966,421

(22) Filed: Oct. 14, 2022

(65) Prior Publication Data

US 2024/0125127 A1   Apr. 18, 2024

(51) Int. Cl.
*E04F 11/18*   (2006.01)
*E04B 1/00*   (2006.01)
*E04B 1/38*   (2006.01)
*F16B 13/08*   (2006.01)

(52) U.S. Cl.
CPC .......... *E04F 11/1812* (2013.01); *E04B 1/003* (2013.01); *E04B 1/388* (2023.08); *F16B 13/0808* (2013.01)

(58) Field of Classification Search
CPC ............... E04F 11/1812; E04F 11/1817; E04F 11/1846; E04F 2011/1819; E04F 2011/1823; E04F 2011/1825; E04B 1/388; E04B 1/003; E04B 1/0038; F16B 13/0808
See application file for complete search history.

(56) References Cited

U.S. PATENT DOCUMENTS

| | | | |
|---|---|---|---|
| 1,169,635 A | | 1/1916 | Grimes |
| 5,875,606 A | * | 3/1999 | Jensen ................ E04G 23/0203 |
| | | | 254/108 |
| 6,161,999 A | | 12/2000 | Kaye et al. |
| 6,213,701 B1 | * | 4/2001 | Ukai ................... F16B 13/0833 |
| | | | 411/340 |
| 2013/0195578 A1 | | 8/2013 | Gleason |
| 2014/0102040 A1 | | 4/2014 | Crook et al. |
| 2018/0112697 A1 | * | 4/2018 | Williams ............. F16B 37/041 |
| | | | (Continued) |

FOREIGN PATENT DOCUMENTS

| | | | | |
|---|---|---|---|---|
| JP | 2001065120 A | * | 3/2001 | ............. F24S 25/20 |
| KR | 2248096 B1 | * | 5/2021 | |

OTHER PUBLICATIONS

Foreign translation of KR102248096B1 attached.*

(Continued)

*Primary Examiner* — Brian D Mattei
(74) *Attorney, Agent, or Firm* — Foley & Lardner LLP; John J. May

(57) ABSTRACT

A toggle anchor system includes a toggle anchor having a top surface with a top surface length, a bottom surface with a bottom surface length that is less than the top surface length, a threaded through hole that extends from the top surface to the bottom surface, and a pair of positioning holes that each extends from the top surface to the bottom surface. The system further includes wherein each of the respective positioning holes are positioned on opposing sides of the threaded through hole and a flexible positioning member having a pair of ends and each end of the flexible positioning member extends through each of the respective pair of positioning holes. The system also includes a fastener having a threaded shaft coupled to the threaded through hole.

8 Claims, 10 Drawing Sheets

(56) References Cited

U.S. PATENT DOCUMENTS

2020/0208666 A1\* 7/2020 Blakley ............... F16B 13/0808
2022/0127811 A1\* 4/2022 Nill ........................ E02D 27/42

OTHER PUBLICATIONS

Foreign translation of JP2001065120A attached.\*
International Search Report and Written Opinion for International Patent Application PCT/US2023/034996 dated Jan. 3, 2024.

\* cited by examiner

TOGGLE BOLT CONNECTOR SYSTEM FOR HOLLOW JOIST

BACKGROUND

A professional contractor often installs railing panel systems. While many applications require that the railing panel system be mounted directly to a wooden surface, such as a deck, other applications require that the railing panel system be mounted to the underlying joists. While securing the railing panel to underlying wooden joists can be readily achieved by driving a fastener into the wooden joist, applications that utilize hollow joists, such as hollow metal joists, present unique challenges.

One such challenge is securing the railing panel system to the hollow joists with sufficient strength. A hole may be drilled through both the top and bottom walls of the hollow joist, then a sufficiently long bolt may be inserted through the holes, and a nut may be secured to the end of the bolt to bear on the outside surface of the bottom wall of the hollow joist. With certain box-joists, extended length bolts are used to extend from the top surface of a base plate through to the underside of the joist. Furthermore, in certain installations, the underside of the joist may be difficult to access making it difficult to thread the nut to the bolt.

Toggle bolt anchors are devices that allow a threaded fastener to be used to secure an item to a substrate when the backside of the substrate is inaccessible, for example the rear surface of a drywall substrate. One example of a toggle bolt anchor is disclosed in U.S. Pat. No. 6,161,999 to Kaye et al. ("Kaye"), which is hereby incorporated by reference. Kaye discloses a toggle bolt device that includes a metal anchor in the form of a C-channel that is pivotally attached to control legs that allow the anchor to be manipulated from a vertical to a horizontal orientation. The Kaye toggle bolt device also includes a collar that is ratcheted to a snug fit with the substrate and together with the legs holds the anchor in place to receive a bolt. Certain applications for a toggle bolt anchor may require a stronger connection than that provided by a C-channel member. Also, certain applications for a toggle bolt anchor, may allow cooperation with features of a structural member to facilitate tightening of a threaded connector into an anchor portion.

SUMMARY OF THE INVENTION

According to a first aspect, a toggle bolt system includes a deck surface having at least one through hole, a railing post positioned above the deck surface, the railing post having at least one through hole. The system further includes a joist positioned below the deck surface, the joist having a cavity defined by a top surface and a pair of opposed side walls extending from the top surface, the top surface defining at least one through hole. The system further includes a toggle anchor having a length that is greater than the diameter of the at least one through hole of the joist, a threaded through hole, a pair of positioning holes, and a flexible positioning member. The system also includes wherein each of the respective positioning holes are positioned on opposing sides of the threaded through hole and an end of a flexible positioning member extends through each of the respective pair of through holes. The system further includes a fastener having a threaded shaft that extends through the at least one through hole of the deck surface, the at least one through hole of the top surface of the joist, and the at least one through hole of the railing post, and the threaded shaft is coupled to the threaded through hole.

According to some embodiments, the joist is a hollow metal joist.

According to other embodiments, the fastener is a bolt.

In some embodiments, the flexible positioning member is a string.

According to yet another embodiment, the flexible positioning member is a pair of flexible positioning members.

In other embodiments, the at least one through hole of the railing post is a plurality of through holes.

According to other embodiments, the joist also has a width and the length of the toggle anchor is greater than the width of the joist.

According to some embodiments, the system also includes a connector that connects the end of the flexible positioning member to another end of the flexible positioning member.

In some embodiments, the toggle anchor is a first toggle anchor and the system also includes a second toggle anchor having a length that is greater than the diameter of the at least one through hole of the joist, a second through hole, and a second pair of positioning holes. The system further includes wherein each of the respective second positioning holes are positioned on opposing sides of the second threaded through hole and an end of the flexible positioning member extends through each of the respective pair of through hole. The system also includes wherein the threaded shaft is coupled to the second threaded through hole.

According to a second aspect, a toggle anchor system includes a toggle anchor having a top surface with a top surface length, a bottom surface with a bottom surface length that is less than the top surface length, a threaded through hole that extends from the top surface to the bottom surface, and a pair of positioning holes that each extends from the top surface to the bottom surface. The system further includes wherein each of the respective positioning holes are positioned on opposing sides of the threaded through hole and a flexible positioning member having a pair of ends and each end of the flexible positioning member extends through each of the respective pair of positioning holes. The system also includes a fastener having a threaded shaft coupled to the threaded through hole.

In some embodiments, the top surface has a center and the threaded through hole is positioned about the center.

In other embodiments, the system further includes a connector that connects the pair of ends of the flexible positioning member to one another.

According to a third aspect, a toggle anchor includes a top surface with a top surface length, a bottom surface with a bottom surface length that is less than the top surface length. The toggle anchor further includes a first side surface that extends from a first end of the bottom surface to a first end of the top surface at a first angle relative to the top surface. The toggle anchor further includes a second side surface that extends from a second end of the bottom surface to a second end of the top surface at a second angle relative to the top surface. The toggle anchor also includes a threaded through hole that extends from the top surface to the bottom surface. The toggle anchor further includes a pair of positioning holes that each extends from the top surface to the bottom surface, wherein the pair of positioning holes are positioned such that the threaded through hole is between the pair of positioning holes.

In some embodiments, the first angle is equal to the second angle.

In other embodiments, the top surface has a center and the threaded through hole is positioned about the center.

BRIEF DESCRIPTION OF THE DRAWINGS

The disclosure will become more fully understood from the following detailed description, taken in conjunction with the accompanying figures, wherein like reference numerals refer to like elements, in which.

The drawings are not necessarily to scale and certain features may be shown exaggerated in scale or in somewhat schematic form in the interest of clarity and conciseness.

DETAILED DESCRIPTION

Embodiments disclosed herein provide a system, an apparatus, and a method for a hollow joist railing post mounting system 100. In particular, embodiments disclosed herein provide a hollow joist railing post mounting system 100 that can be used to secure railing posts 102 to hollow joists 106 that form a frame to support a deck 104 (see FIG. 1A). Railing panel brackets are supported by the railing posts 102, and a railing panel (not shown) may be set in the brackets and secured to spaced-apart posts to provide a railing barrier around a perimeter of a deck. The railing panel may be pre-assembled and manufactured in standard or custom lengths before delivery to the job site. A contractor may cut the pre-assembled railing panel to fit the particular spacing between railing posts 102.

Figure 1A:
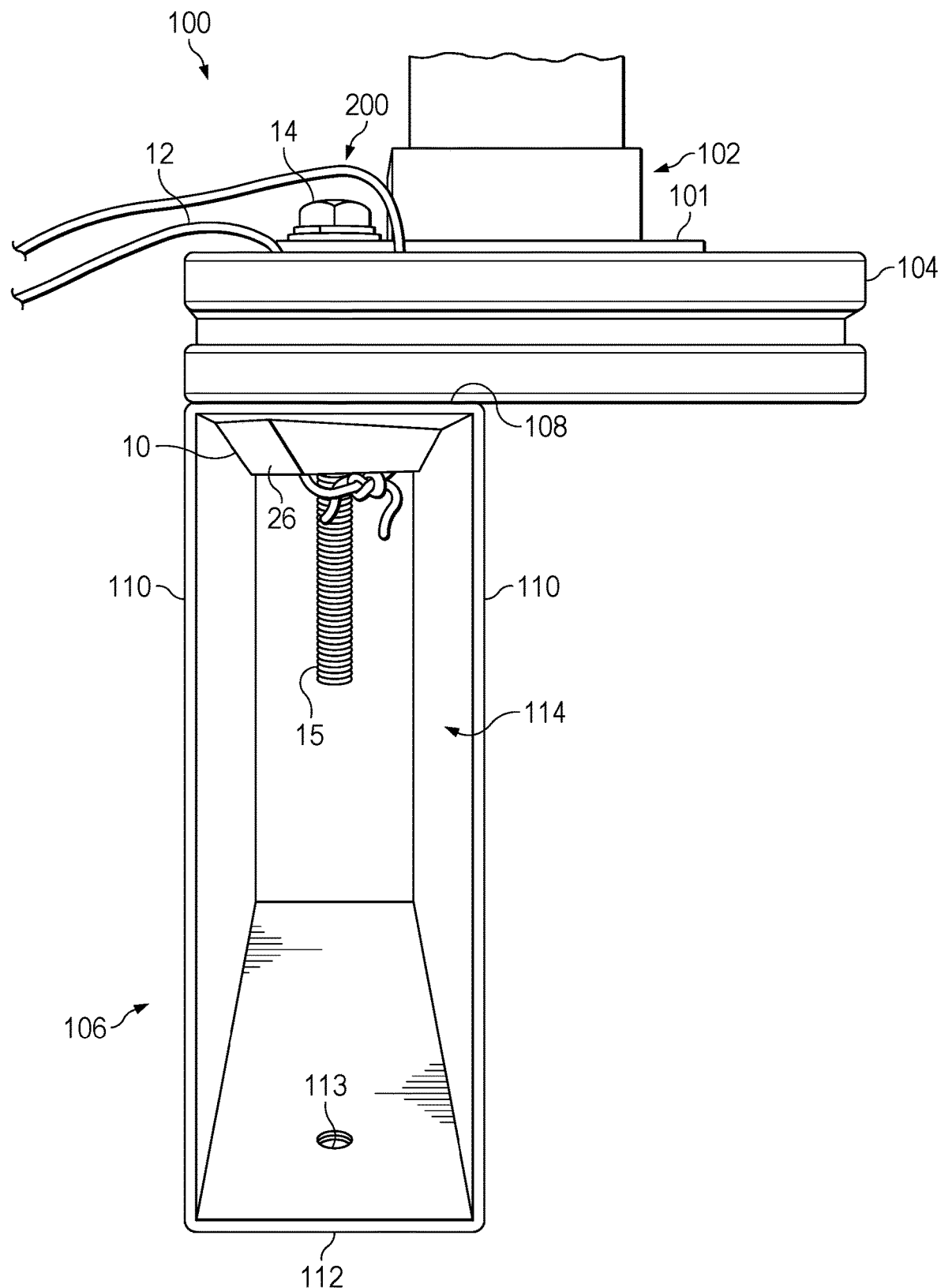
FIGS. 1A, 1B, 1C, and 1D illustrate a perspective view and cross-sectional side views of an embodiment of the present disclosure of a hollow joist railing post mounting system showing multiple positions of the toggle anchor during installation.

Referring now to FIG. 1A, which depicts a perspective view of an embodiment of a fully installed hollow joist railing post mounting system 100. The illustrated embodiment depicts a hollow joist 106, a deck 104, and a railing post 102, all secured together with a toggle anchor mounting system 200. The hollow joist 106 includes a top wall 108, a pair of opposed sidewalls 110, and a bottom wall 112. The pair of opposed sidewalls 110 extend between the top wall 108 and the bottom wall 112 define a cavity 114 within the hollow joist 106. One or more weep holes 113 may be formed to allow liquid, for example rain water, to drain from the hollow joist 106. Hollow joists 106 are readily formed of metallic materials such as steel or aluminum, however the hollow joist 106 can be formed of any suitable material.

The deck 104 is commonly formed of wooden planks or other wooden materials. However, those of ordinary skill in the art will recognize, the deck 104 can be made of any suitable material, including composite lumber, polyvinyl chloride (PVC), concrete, or any other suitable material.

The hollow joist railing post mounting system 100 is secured to the underlying floor with a series of toggle anchor mounting systems 200 that are installed through mounting holes formed or drilled in the base plate 101 of a railing post 102, deck 104, and hollow joist 106, as explained in further detail below. FIGS. 1A, 1B, 1C, and 1D show one of the toggle anchors 10 installed through one hole in a base plate of a railing post. A typical railing post is secured to the deck with four toggle anchors 10 and bolts. Typically, a deck 104 is fully installed prior to installing the railing posts 102, thereby restricting the access to the underside of the deck 104 and by extension, the bottom wall 112 of the hollow joists 106. The hollow joist railing post mounting system 100 can be fully installed from the top side of the deck 104 without requiring access to the bottom wall 112 of the hollow joist 106. Moreover, the hollow joist railing post mounting system 100 does not require excessively long fasteners to extend through the railing post 102, deck 104, and the bottom wall 112 of the hollow joist 106.

Figure 2:
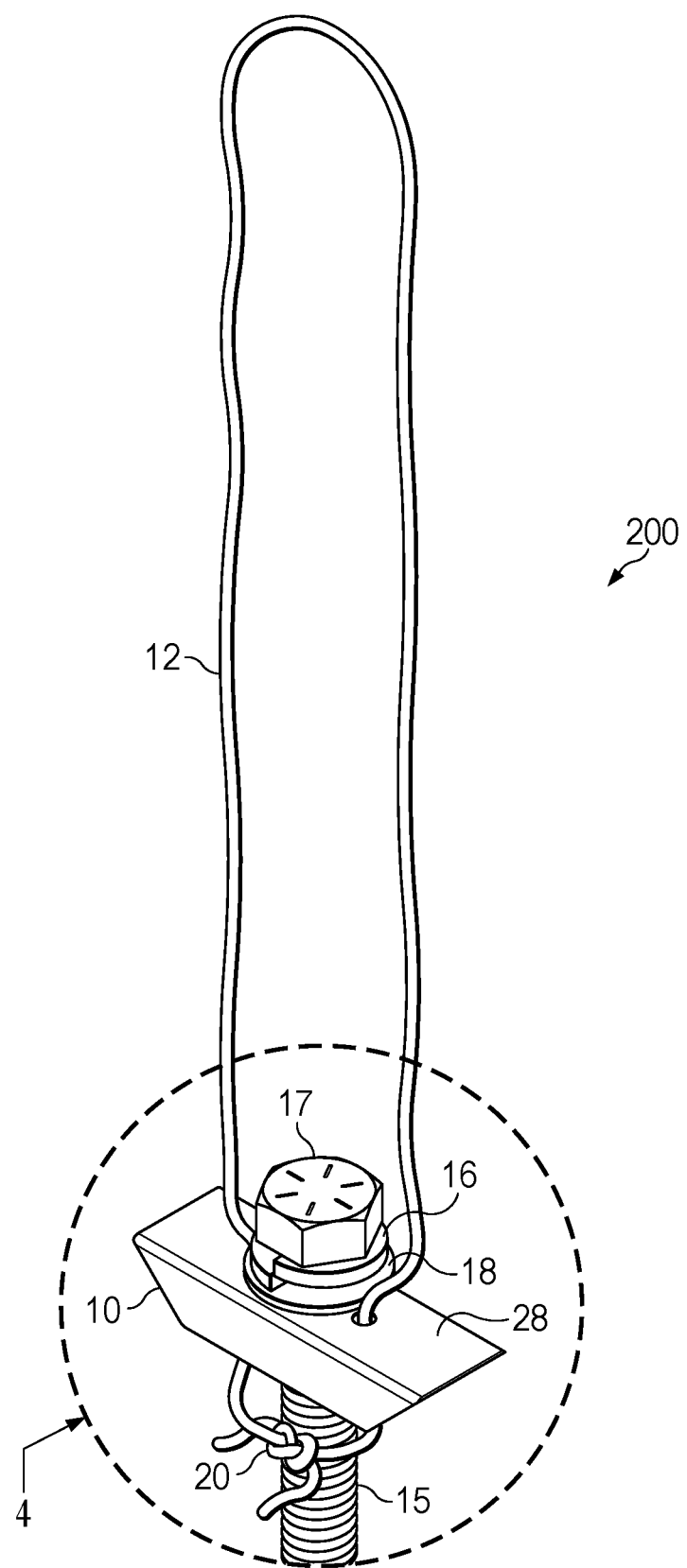
FIG. 2 illustrates a side perspective view of an embodiment of the present disclosure of a toggle anchor mounting system.

As shown in FIG. 2 and discussed in further detail below, the toggle anchor mounting system 200 includes a toggle anchor 10 (also referred to as a toggle nut), a flexible positioning member 12, and a fastener 14. According to certain embodiments, the flexible positioning member 12 may be a length of twine with ends tied in a knot 20 to form a loop through the toggle anchor 10. According to an alternate embodiment, the ends of the flexible positioning member 12 may be joined using other techniques. The flexible positioning member 12 should have a length sufficient to extend to be grabbed by the installer in the event the toggle anchor 10 is unintentionally dropped within the cavity 114 to the bottom wall 112 of the hollow joist 106.

Figure 1B:
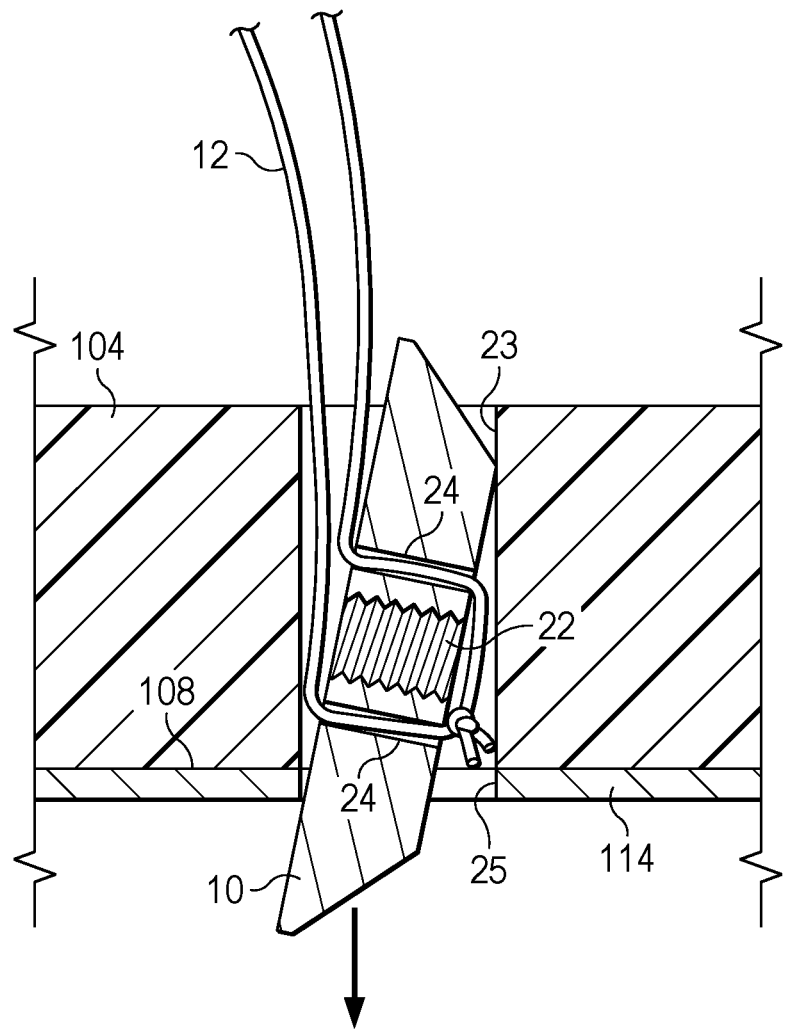
Figure 1C:
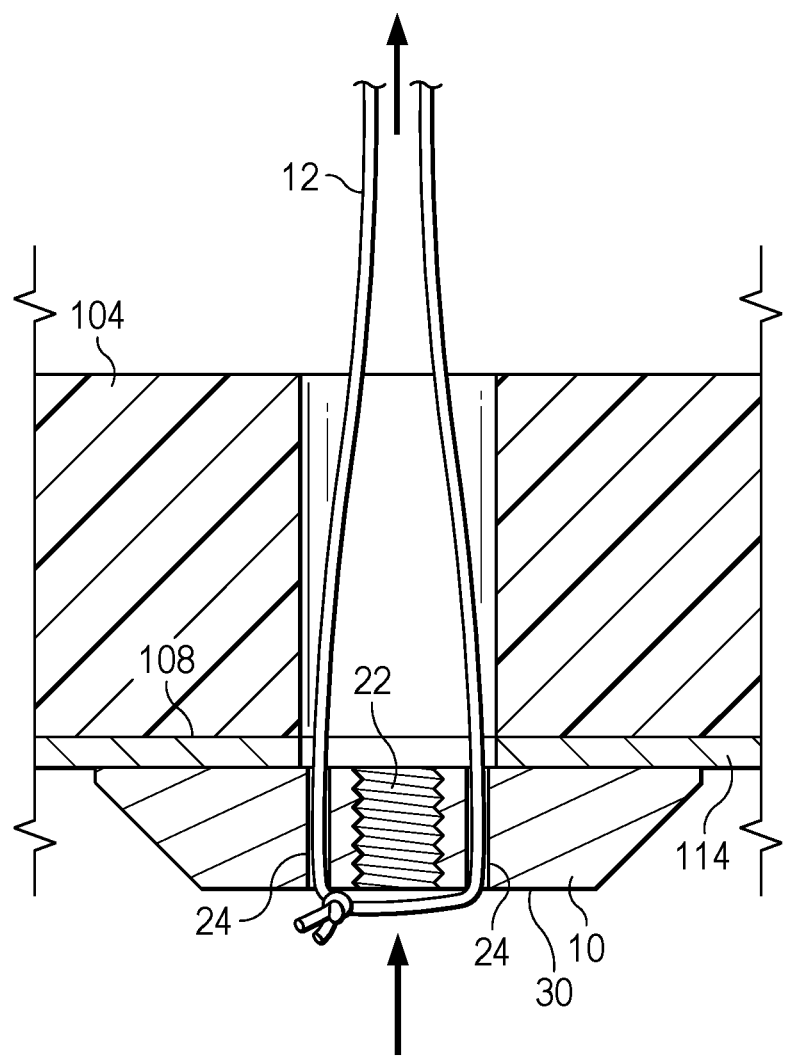
Figure 1D:
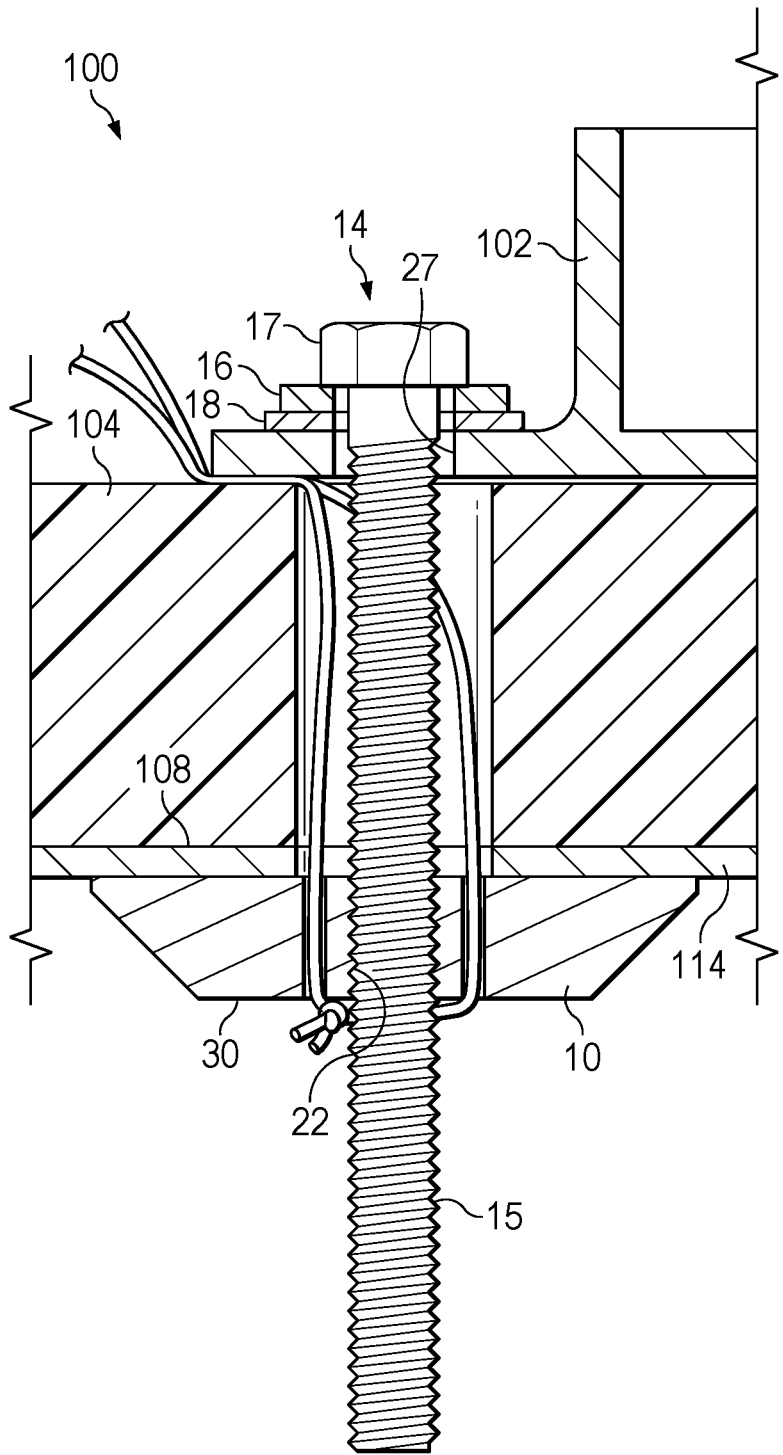

As shown in FIGS. 1B, 1C, and 1D, when oriented generally vertically, the toggle anchor is sized and shaped to be received through a through hole 23 in the deck 104 that is aligned with a through hole 25 in the top wall 108 of the hollow joist 106, as shown in FIG. 1B. The shaft 15 of a fastener 14 may then be received through hole 27 in the base plate 101 of the railing post 102, the through hole 23 in the deck 104, the through hole 25 in the top wall 108 of the hollow joist 106, and threaded into the threaded through hole 22 in the toggle anchor 10, as shown in FIG. 1D. According to an alternate embodiment, the hole 27 in the base plate may be large enough to receive the toggle anchor 10 when the toggle anchor 10 is oriented generally vertically.

An installer may lower the toggle anchor 10 into the cavity 114 of the hollow joist 106 while holding on to flexible positioning member 12, which is attached to the toggle anchor 10. With the toggle anchor 10 fully received within the cavity 114, the flexible positioning member 12 is used to manipulate the toggle anchor 10 within the cavity 114. For example, the installer may use the flexible positioning member 12 to orient the toggle anchor 10 horizontally and bring the top surface 28 of the toggle anchor 10 to contact or abut the interior surface of the top wall 108 of the hollow joist 106. In this position, with the threaded through hole 22 of the toggle anchor aligned with the through holes in the base plate 101, the deck 104, and the top wall 108 of the hollow joist 106, the fastener 14 is inserted into the threaded through hole 22 to engage the threads of the threaded through hole 22 with the threaded shaft 15 of the fastener 14. The toggle anchor 10 has a length that is greater than the width of the cavity 114 of the hollow joist 106. Thus, the sidewalls 110 of the hollow joist 106 will prevent further rotation of the toggle anchor within the cavity 114 that would otherwise be caused by rotating the fastener into threaded engagement with the threaded through hole 22 of the toggle anchor 10.

Once fastener 14 engages the threaded through hole 22, the toggle anchor 10 will begin to rotate within the cavity 114. The toggle anchor 10 interferes with or otherwise contacts the pair of opposed sidewalls 110 of the hollow joist 106. The interference of the toggle anchor 10 with the pair of opposed sidewalls 110 prevents the toggle anchor 10 from rotating unbounded within the cavity 114 of the hollow joist 106, which allows the fastener 14 to be threaded into tight engagement with the threaded through hole 22 of the toggle anchor 10.

Figure 3:
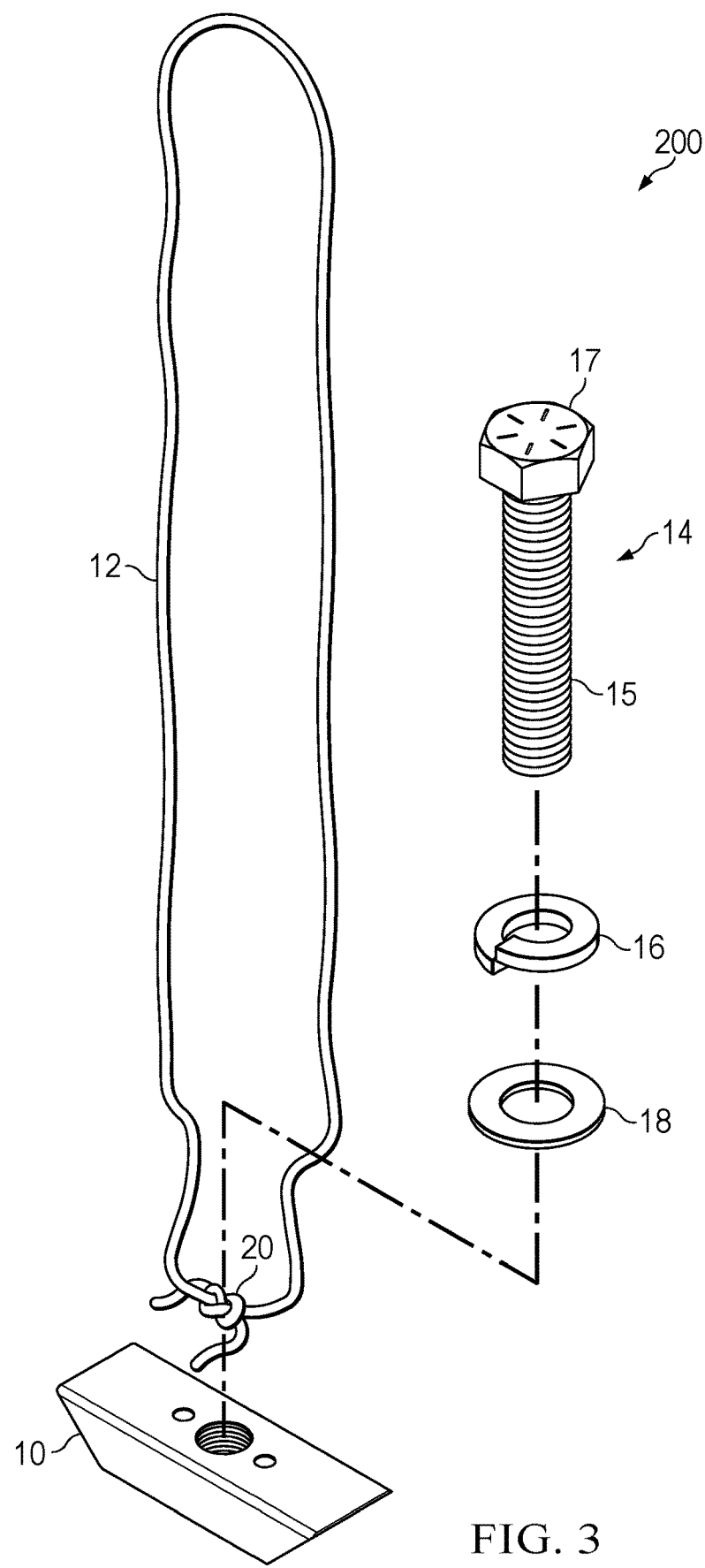
FIG. 3 illustrates a side perspective exploded view of an embodiment of the present disclosure of a toggle anchor mounting system.

Referring now to FIGS. 2 and 3, which respectively depict a side perspective view and a side perspective exploded view of an embodiment of a toggle anchor mounting system 200. The illustrated embodiment depicts a toggle anchor 10, a flexible positioning member 12, a fastener 14, and a connector 20, such as a square knot. The fastener 14 includes a threaded shaft 15. The fastener 14 may be a bolt or screw however, any suitable type of male fastener is contemplated by this disclosure.

The flexible positioning member 12 functions such that the toggle anchor 10 can be lowered through the aligned hole 23 in the deck 104 and the hole 25 in the top wall 108 of the hollow joist 106, then be tensioned or otherwise manipulated such that the top surface 28 of the toggle anchor 10 contacts the interior surface of the top wall 108 of the hollow joist 106. The flexible positioning member 12 is sufficiently flexible to allow the toggle anchor 10 to be manipulated through the aligned hole 23 in the deck 104 and the hole 25 in the top wall 108 of the hollow joist 106.

The connector 20 connects the ends of the flexible positioning member 12. The connector 20 may be a separate component, however in other embodiments, the ends of the flexible positioning member 12 are connected to one another by forming a knot, such as a square knot, with the two ends of the flexible positioning member 12. The connector 20 is capable of holding the ends of the flexible positioning member 12 together while the flexible positioning member is being tensioned to bring the top surface 28 of the toggle anchor 10 in contact with the interior surface of the top wall 108 of the hollow joist 106. According to certain embodiments, the connector 20 or knot should be large enough such that it will not fit through the positioning holes 24 in the toggle anchor 10. According to an alternate embodiment, the connector 20 may be positioned on the opposite side of the flexible positioning member 12 to facilitate removal of the flexible positioning member 12 upon cutting or otherwise severing the flexible positioning member 12.

The flexible positioning member 12 may be formed of a length of string, twine, or cable tie. However, any form of suitably flexible material or article can be utilized as the flexible positioning member 12. According to one embodiment, the flexible positioning member may be a length of braided nylon twine. In one embodiment, the length of the flexible member 22 from one end to the opposite end is approximately four feet. Thus, forming a loop of the flexible member 22 allows approximately two feet of the flexible positioning member to be grasped by the installer while lowering the toggle anchor 10 into the cavity 114.

Figure 4:
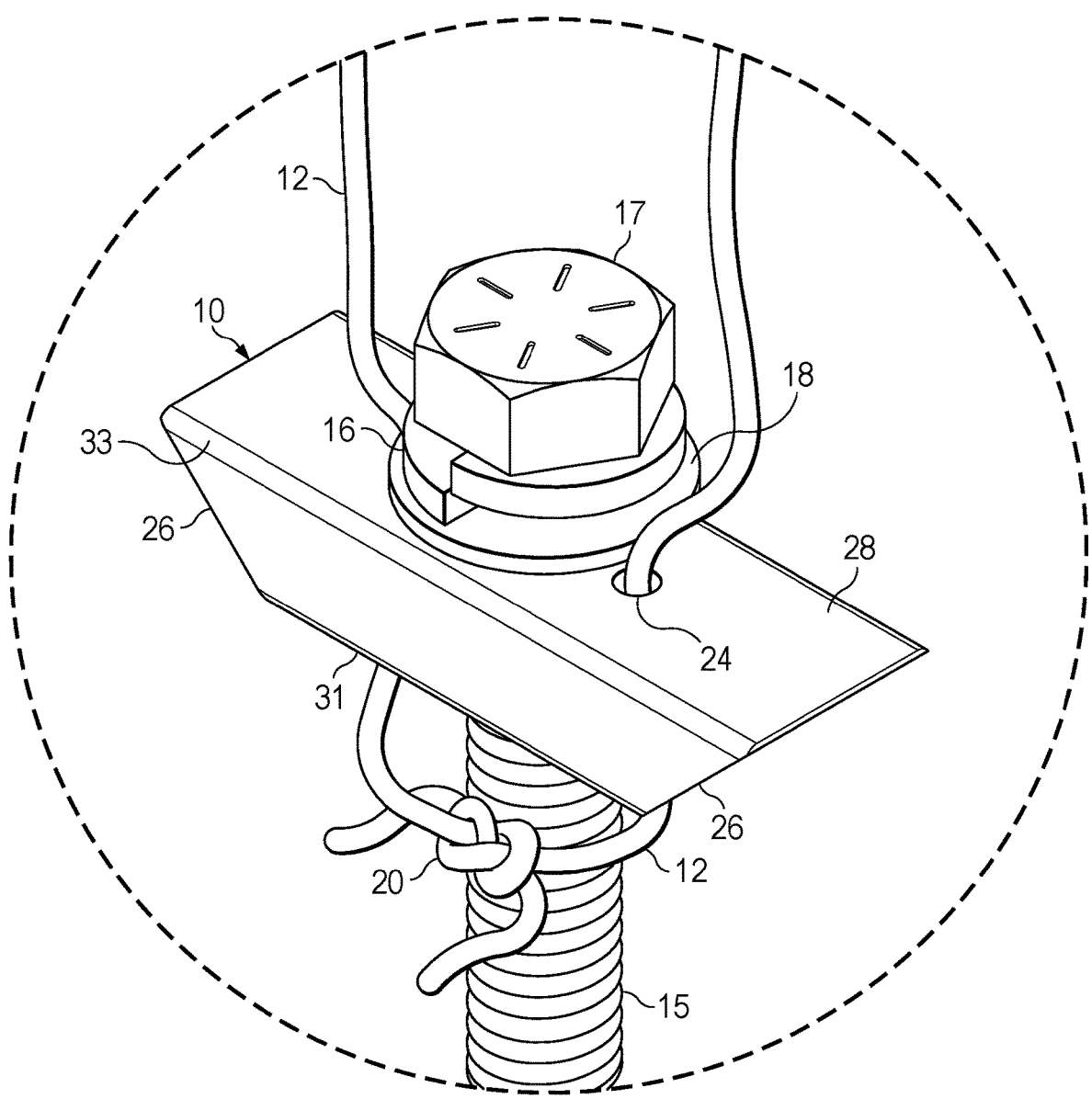
FIG. 4 illustrates a side perspective view of an embodiment of the present disclosure of a toggle anchor mounting system.

Referring now to FIG. 4, which depicts a detail perspective view of the toggle anchor mounting system 200 in FIG. 2. In FIG. 4, the connector 20 of the flexible positioning member 12 is presently depicted below the bottom surface 30 of the toggle anchor 10. However, the connector 20 can alternatively be positioned above the top surface 28 of the toggle anchor 10.

Figure 5:
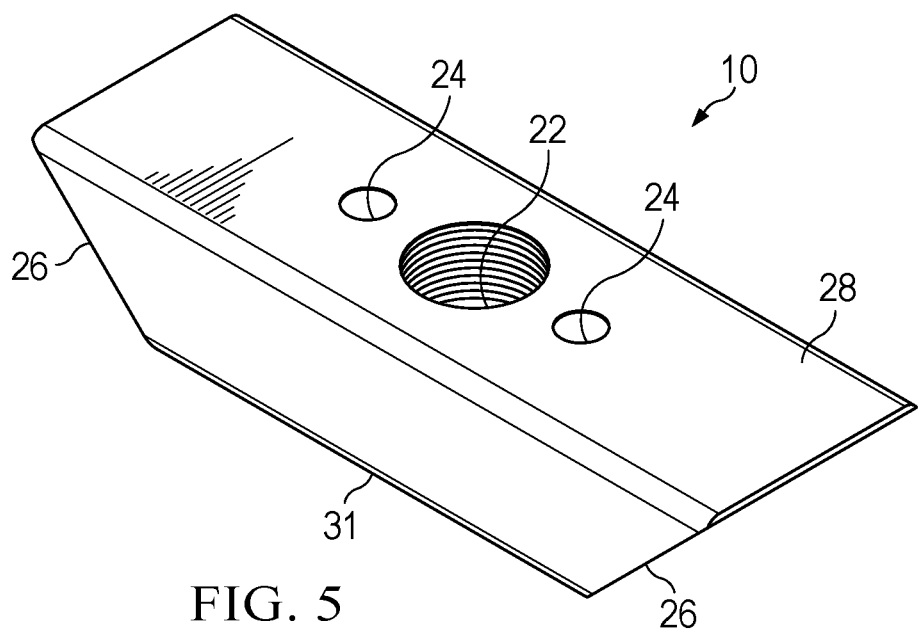
FIG. 5 illustrates a side perspective view of an embodiment of the present disclosure of a toggle anchor.

Referring now to FIG. 5, which depicts a side perspective view of an embodiment of a toggle anchor 10. The illustrated embodiment depicts a toggle anchor 10, which includes a top surface 28, a pair of opposed end surfaces 26, a bottom surface, a threaded through hole 22, and a pair of positioning holes 24. The threaded through hole 22 is sized to accept and engage the fastener 14. According to one embodiment, the toggle anchor 10 may be formed from bar stock of a metal, such as steel or aluminum. The toggle anchor 10 may be galvanized to prevent corrosion. The toggle anchor 10 may have a height in a range of 0.3 inches through 0.8 inches, for example approximately 0.4 inches. The height of the toggle anchor supports a robust threaded engagement with the threaded through hole 22 and the fastener 14. Such robust engagement allows the toggle anchor mounting system 200 to support and fasten posts supporting a railing panel that may be subject to significant lateral loads if a person's body weight suddenly bears on the railing panel, if for example, the person falls against the railing panel.

The top surface 28 has a longer length than the bottom surface of the toggle anchor 10 due to the sloped or angled opposed end surfaces 26. According to one embodiment, the end surfaces 26 may sloped at approximately a 45 degree angle. The angled end surfaces 26 may facilitate insertion of the toggle anchor 10 through the aligned hole 23 in the deck 104 and the hole 25 in the top wall 108 of the hollow joist 106. In addition, the profile of the toggle anchor 10 includes chamfered and rounded edges 31 and 33 that may minimize the size of the holes through the base plate 101, the deck 104, and the top wall 108 of the hollow joist 106. The sloped end surfaces 26 also reduce the amount of material, for example steel, used for the toggle anchor 10. According to embodiments with the sloped end surfaces 26, the edges of the top surface 28 to contact the pair of opposed sidewalls 110 when the fastener 14 causes the toggle anchor 10 to rotate within the cavity 114.

The positioning holes 24 are positioned such that there is one positioning hole 24 on either side of the threaded through hole 22. Having one positioning hole 24 on either side of the threaded through hole 22 allows for a user to have a greater degree of control when aligning the threaded through hole 22 with the aligned holes that the toggle anchor 10 was manipulated through. The centers of the positioning holes 24 are aligned with the center of the threaded through hole 22.

Figure 6:
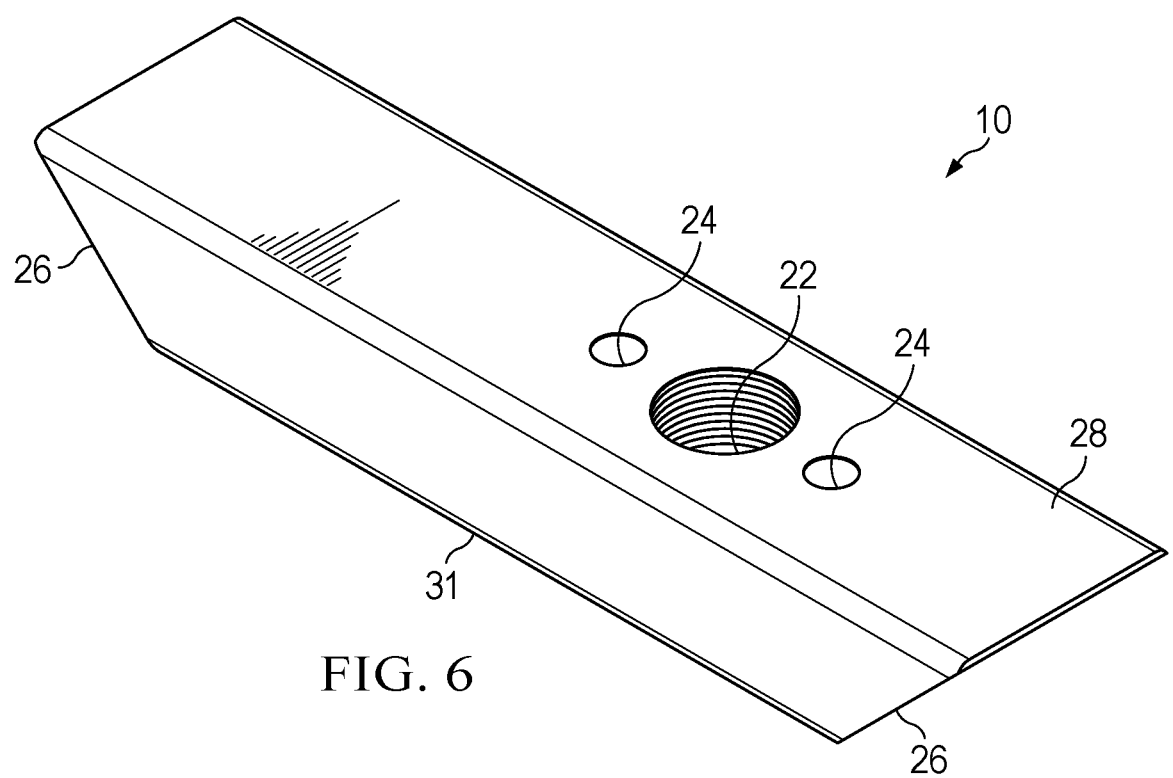
FIG. 6 illustrates a side perspective view of another embodiment of the present disclosure of a toggle anchor.

Referring now to FIG. 6, which depicts a side perspective view of an alternate embodiment of a toggle anchor 10. The toggle anchor 10 illustrated in FIG. 6 includes all of the features and elements as the toggle anchor illustrated in FIG. 5. The notable difference between the FIGS. 5 and 6 is that the threaded through hole 22 and positioning holes 24 in FIG. 5 are centered along the length of the top surface 28, whereas in FIG. 6 those elements are offset to one side of the top surface 28. A longer toggle anchor 10 also serves to distribute the load over a greater surface area.

Figure 7:
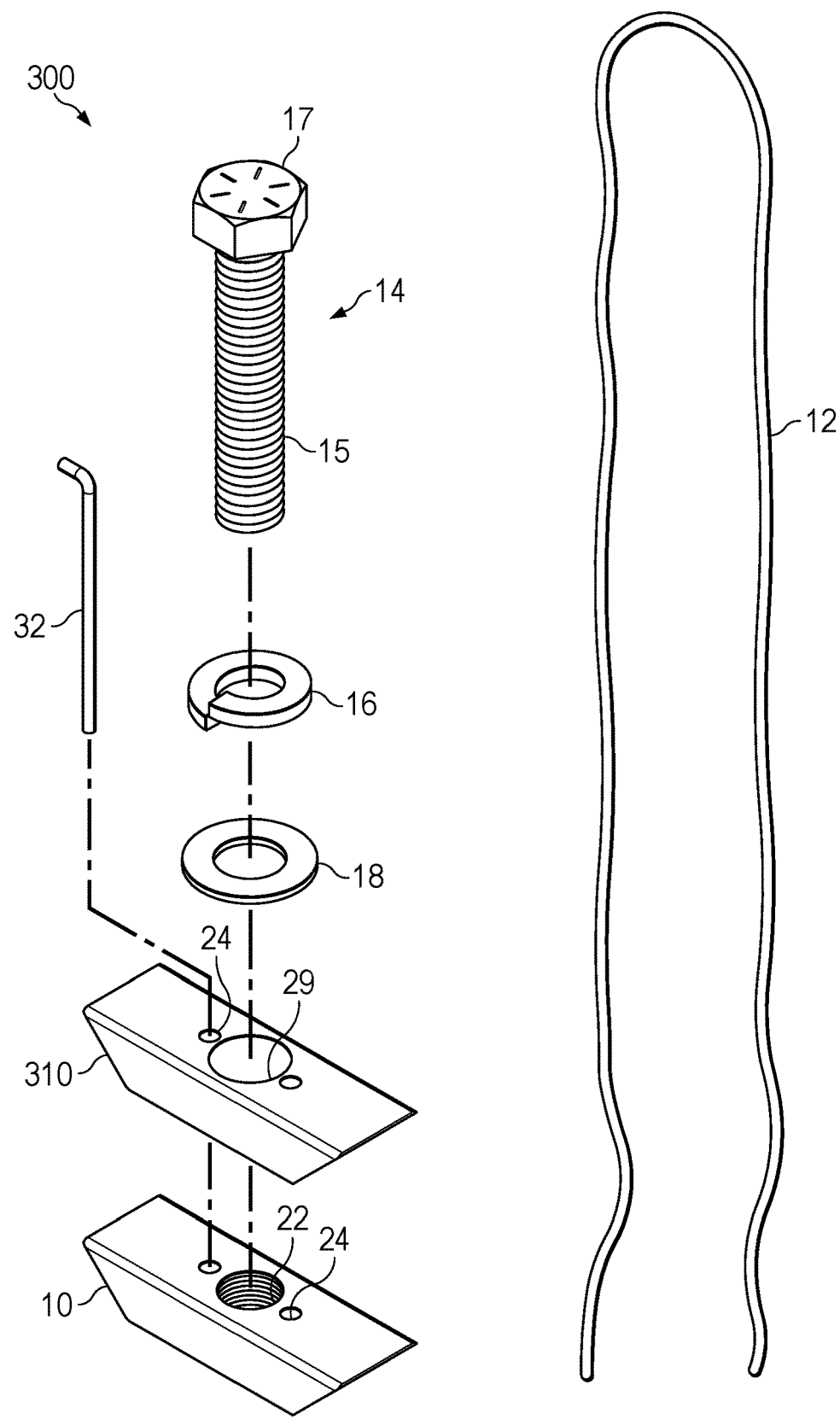
FIG. 7 illustrates a side perspective exploded view of an embodiment of the present disclosure of a double toggle anchor mounting system.

Referring now to FIG. 7, which depicts a perspective exploded view of an embodiment of a double toggle anchor mounting system 300. The double toggle anchor mounting system 300 includes all of the components and elements of the toggle anchor mounting system 200 and adds a second toggle anchor 310 and an alignment pin 32. According to one embodiment, the second toggle anchor 310 may be substantially similar to the toggle anchor 10 with the exception of having an unthreaded through hole 29 in place of a threaded through hole. The unthreaded through hole ensures second toggle anchor 310 remains flush with the first toggle anchor 10 when tightened. The alignment pin 32 ensures the double toggle anchors remain aligned in fastening and maintain the additional strength imparted by the second toggle anchor 10.

Certain applications may require that the threaded shaft 15 of the fastener 14 be engaged with more threads than are available within a threaded through hole 22 of a single toggle anchor 10. Increasing the dimension between the top surface 28 and the bottom surface 30 would increase the number of threads contained within the threaded through hole 22. Such enlargement may be accommodated with the aligned hole 23 in the deck 104 and the hole 25 in the top wall 108 of the hollow joist 106 also being enlarged. According to an alternate embodiment, a second toggle anchor 10 can be utilized to avoid having to enlarge the aforementioned holes while increasing the number of threads from the threaded through hole 22 that the threaded shaft 15 of the fastener 14 engages with.

The double toggle anchor mounting system 300 is utilized in the same manner as the toggle anchor mounting system 200 as described above with the following exceptions to such use. First, the threaded through hole 22 of the first toggle anchor 10 is aligned with the threaded through hole 22 of the second toggle anchor 310 such that the bottom surface 30 of the first toggle anchor contacts the top surface 28 of the second toggle anchor 310. Then the pair of positioning holes 24 of the first toggle anchor 10 align with the positioning holes 24 of the second toggle anchor 310. Then the pin 32 is inserted into one of the aligned pair of positioning holes 24 of the first toggle anchor 10 and second toggle anchor 310. Then, the flexible positioning member 12 is passed through the aligned pair of positioning holes 24 and the connector 20 is applied to the ends of the flexible positioning member 12. According to one embodiment, the first and second toggle anchors may be disassembled to allow them to be received sequentially through reduced diameter a hole 23 in the deck 104 and the hole 25 in the top wall 108 of the hollow joist 106 with a reduced diameter.

The toggle anchor mounting system 200 may be used to secure a base 101 of a railing post 102 secured to a hollow joist 106 according to the following method. The method begins by aligning holes formed in the hollow joist 106, deck 104, and railing post 102. Then, the toggle anchor 10 is oriented vertically and inserted through the aforementioned aligned holes while holding the flexible positioning member 12. The flexible positioning member 12 is used to manipulate the toggle anchor 10 to orient the toggle anchor 10 horizontally such that the top surface 28 of the toggle anchor 10 is in position to contact the interior surface of the top wall 108 of the hollow joist 106. The threaded through hole 22 of the toggle anchor 10 is aligned with the aligned hole 23 in the deck 104 and the hole 25 in the top wall 108 of the hollow joist 106. The threaded shaft 15 of the fastener 14 is inserted into threaded engagement with the threaded through hole 22. The fastener 14 may then be tightened to clamp the base plate 101, the deck 104, and the top wall 108 of the hollow joist 106 between a head 17 of the fastener 14 and the toggle anchor 10. Once the toggle anchor 10 is in threaded engagement with the fastener 14, such that the position of the toggle anchor 10 is in alignment with the holes in the base plate 101, the deck 104, and the top wall 108 of the joist 106, the flexible positioning member 12 may be cut and allowed to fall into the cavity 114 or may be pulled through the positioning holes 24.

Optionally, the toggle anchor mounting system 200 can include various amounts and types of washers, such as a lock washer 16 and a flat washer 18. However, any suitable combination of washers can be utilized.

Although embodiments of a hollow joist railing post mounting system 100 have been described in detail, those skilled in the art will also recognize that various substitutions and modifications may be made without departing from the scope and spirit of the appended claims.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but to the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A toggle anchor system, comprising:
   a deck having at least one deck through hole;
   a railing post supported by the deck and having a base plate defining at least one through hole aligned with the at least one deck through hole;
   a joist supporting the deck, the joist having a cavity defined by a top wall and a pair of opposed side walls extending from the top wall, the top wall defining at least one joist through hole aligned with the deck through hole;
   a toggle anchor disposed within the cavity and defining a threaded through hole and a pair of positioning holes and having a length greater than a diameter of the at least one joist through hole, the toggle anchor having a first surface with a first surface length;
   a flexible positioning member extending through each one of the pair of through holes; and
   a fastener having a threaded shaft configured to extend through the at least one deck through hole and the at least one joist through hole and the at least one through hole of the base plate, the threaded shaft configured to be in threaded engagement with the threaded through hole of the toggle anchor;

wherein the cavity has a cavity width measured between the pair of opposed side walls and the first surface length of the toggle anchor is greater than the cavity width.

2. The system of claim 1, wherein the joist is a hollow metal joist.

3. The system of claim 1, wherein the fastener is a bolt.

4. The system of claim 1, wherein the flexible positioning member is a string.

5. The system of claim 1, wherein the at least one through hole of the base plate is a plurality of through holes.

6. The system of claim 1, further comprising a connector that connects an end of the flexible positioning member to another end of the flexible positioning member.

7. The system of claim 1, wherein the toggle anchor is a first toggle anchor and further comprising a second toggle anchor having a length that is greater than the diameter of the at least one through hole of the joist, a fastener receiving through hole, and a second pair of positioning holes;
   wherein each of the respective second pair of positioning holes is positioned on opposing sides of the fastener receiving through hole and the flexible positioning member extends through each of the respective second pair of positioning holes; and
   the threaded shaft configured to be received through the fastener receiving through hole.

8. The system of claim 1, wherein the toggle anchor further comprises a second surface with a second surface length that is less than the first surface length, a first side surface that extends from a first end of the second surface to a first end of the first surface at a first angle relative to the first surface, a second side surface that extends from a second end of the second surface to a second end of the first surface at a second angle relative to the first surface.

* * * * *